C. MADDUX.
HOG-WASHING MACHINES.
No. 194,607. Patented Aug. 28, 1877.
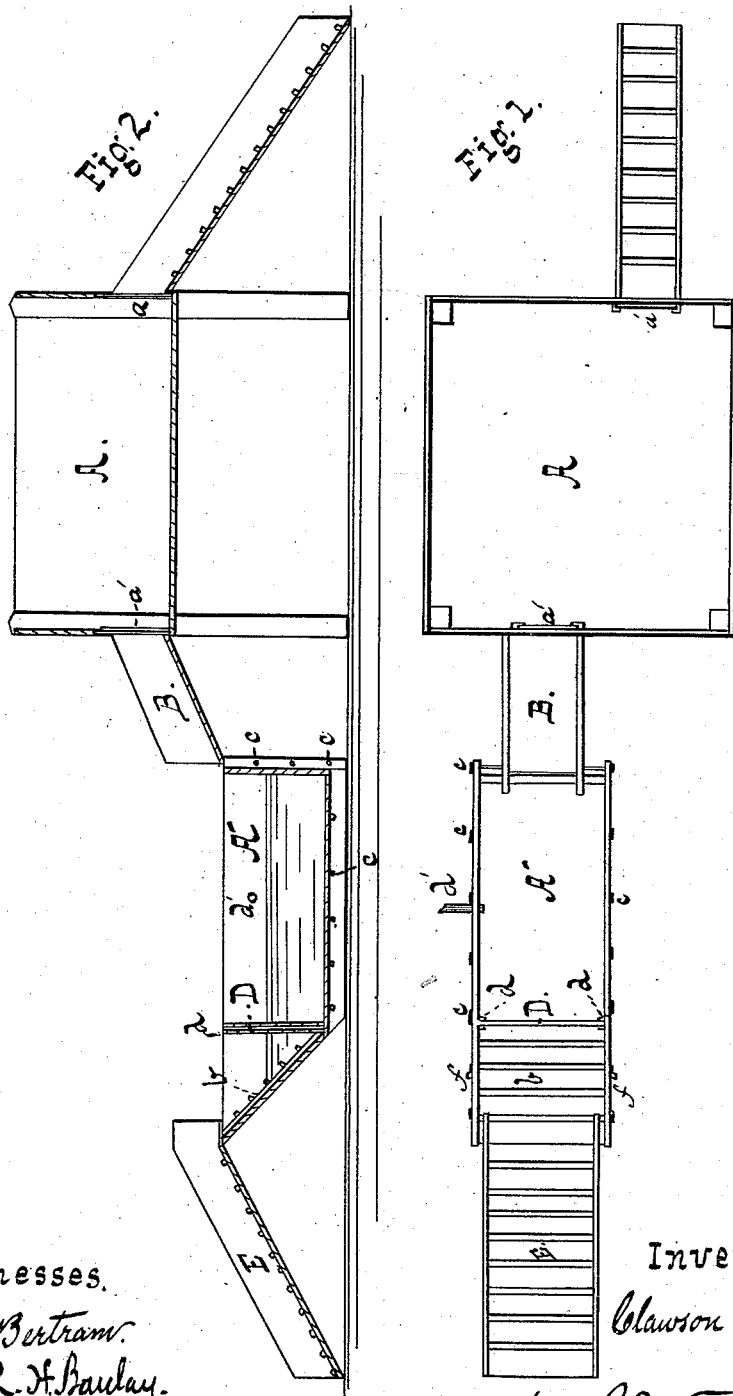
Witnesses.
W. A. Bertram.
D. L. H. Barclay.
Inventor.
Clawson Maddux
per R. D. Williams.
Attorney.

UNITED STATES PATENT OFFICE.

CLAWSON MADDUX, OF CLARKSBURG, OHIO.

IMPROVEMENT IN HOG-WASHING MACHINES.

Specification forming part of Letters Patent No. 194,607, dated August 28, 1877; application filed July 31, 1877.

*To all whom it may concern:*

Be it known that I, CLAWSON MADDUX, of Clarksburg, Ross county, State of Ohio, have invented certain new and useful Improvements in Apparatus for Washing Swine; and I hereby declare the same to be fully, clearly, and exactly described as follows, reference being had to the accompanying drawings, in which—

Figure 1 represents a plan view of my device, and Fig. 2 a vertical longitudinal sectional view of the same.

Observation and experience have convinced me that the common practice of hog-raisers permitting their swine to wallow at pleasure in mud and pools of water scarcely more fluid than mud, apparently upon the theory that a hog, being naturally a dirty animal, every facility should be afforded him for keeping himself as filthy as possible, is utterly wrong in principle, and, being flatly in defiance of physiological law, is in the highest degree deleterious to the health of the animal. It is, moreover, a popular error to suppose that a hog is by nature a filthy animal. His wallowing in the mire is not for the purpose of coating himself with mud merely to be dirty, but has for its object the removal of parasites from his skin and the prevention of their further attacks by interposing a mechanical barrier. That other and highly injurious results follow is self evident. No animal can be healthy if the pores of his skin are continually stopped up, and a plunge into cold water or cold mud immediately after a full meal might naturally be expected to produce the result which attends it—cholera, to wit.

I am convinced that hog-cholera is due in great measure to the causes just stated, and the object of my invention is to remedy the evils named by removing their causes.

To this end I remove the parasites which infest the skin of the hog by scrubbing or cleansing him at such times that a bath can do no harm, and, the necessity for wallowing being removed, the animal shows no inclination thereto. As a precaution, however, I remove the means by keeping him in a dry place.

In carrying out this theory I make use of the device illustrated in the accompanying drawings.

A represents a pen of suitable or ordinary construction, provided with doors $a\ a'$ for the ingress and exit of the swine. Inclined ways, battened in order to give a foot-hold, connect the parts of the device.

A way, B, connects the pen with the tank $A'$, which latter is constructed of suitable well-seasoned timber, bolted together by means of the bolts $c\ c$. The tank is inclined at the exit end, and the incline is provided with a removable battened plank, $b$. Guides $d\ d$ are secured to the sides of the tank vertically at the point of junction of the inclined end and the bottom of the tank, and a door, D, slides freely therein. The guides serve also to prevent the inclined plank $b$ from floating or sliding backward into the tank when the door is removed. A pipe, $d'$, communicates with the tank for the purpose of warming the water therein contained—a result which may be accomplished by passing steam through the pipe, or by returning the pipe to the tank at a different level from its exit, the intermediate portion of the pipe passing through a fire-box. A battened way, E, serves as an exit from the tank.

In using the device the swine are driven into the pen, and then, one by one, into the tank, where they are scrubbed with a broom or coarse brush. When the washing is complete the door D is raised and the animal is allowed to walk out. Sometimes he requires to be driven out. Very little objection, even at first, is raised against the bath.

The efficacy of coal-oil as a preventer and cure of skin diseases is well known, and hog-raisers are in the habit of sprinkling their swine with the oil. By this means much oil is wasted, and the swine are not completely moistened with the oil. When it is desired to treat the hogs with the oil, I simply float a quantity of it upon the water in the tank and drive them therethrough, whereby they are completely oiled, and waste of the oil is prevented.

The water in the tank in cold weather should be properly warmed, as stated.

The tank may be mounted upon rollers or runners, and is furnished with hooks $ff$, for attachment of traces in moving it from place to place.

The tank A' will be found very useful in other ways. The door and battened plank being removed, it may be used as a boiler in which to swell and cook fodder, steam being driven through the pipe $d'$. When the corn or fodder is cooked it may be readily and completely raked out at the inclined end. The tank is also useful as a scalding-tank, in which the slaughtered hogs are immersed, in order to facilitate the removal of their bristles.

A cover, preferably made in two parts, meeting in the middle, may be hinged at either side of the tank. In this case the wings of the cover should be made to lean outward at about an angle of forty-five degrees when they are opened, thus serving to shed any water back into the tank which would otherwise be splashed out over the sides.

Having thus described my invention, what I claim as new, and desire to secure by Letters Patent, is—

1. The tank A', provided with the door D and removable battened way $b$, substantially as described, and for the purpose set forth.

2. The tank A', having inclined end, removable battened way $b$, door D, and pipe $d'$, all substantially as described, and for the purposes set forth.

3. The device herein described, consisting of the pen A, tank A', having door D and battened way $b$, and exit-way E, all as and for the purpose set forth.

Witness my hand this 23d day of July, 1877.

C. MADDUX.

Witnesses:
R. D. WILLIAMS,
D. H. BARCLAY.